(12) United States Patent
Zhong

(10) Patent No.: US 11,834,091 B2
(45) Date of Patent: Dec. 5, 2023

(54) CHILD STROLLER FRAME

(71) Applicant: Wonderland Switzerland AG, Steinhausen (CH)

(72) Inventor: Zhi-Ren Zhong, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/735,122

(22) Filed: May 3, 2022

(65) Prior Publication Data

US 2022/0258786 A1    Aug. 18, 2022

Related U.S. Application Data

(63) Continuation of application No. 16/736,783, filed on Jan. 7, 2020, now Pat. No. 11,358,623.

(30) Foreign Application Priority Data

Jan. 8, 2019  (CN) .......................... 201910019182.X

(51) Int. Cl.
| | |
|---|---|
| *B62B 7/06* | (2006.01) |
| *B62B 7/10* | (2006.01) |
| *B62B 7/04* | (2006.01) |
| *B62B 7/14* | (2006.01) |

(52) U.S. Cl.
CPC .............. *B62B 7/064* (2013.01); *B62B 7/044* (2013.01); *B62B 7/10* (2013.01); *B62B 7/14* (2013.01)

(58) Field of Classification Search
CPC .. B62B 7/10; B62B 7/08; B62B 7/062; B62B 7/06
See application file for complete search history.

(56) References Cited

U.S. PATENT DOCUMENTS

| | | | | |
|---|---|---|---|---|
| 3,504,925 | A | * | 4/1970 | Glaser ........................ B62B 7/08 280/650 |
| 3,736,021 | A | * | 5/1973 | MacLaren .............. A61G 5/085 297/42 |
| 5,181,735 | A | * | 1/1993 | Onishi ....................... B62B 7/08 280/42 |
| 5,468,009 | A | * | 11/1995 | Eyman ...................... B62B 7/08 280/47.38 |

(Continued)

FOREIGN PATENT DOCUMENTS

| | | | | |
|---|---|---|---|---|
| CN | 113511250 B | * | 1/2023 | |
| CN | 112793652 B | * | 5/2023 | ............... B62B 7/06 |

*Primary Examiner* — Emma K Frick
(74) *Attorney, Agent, or Firm* — NZ CARR LAW OFFICE

(57) ABSTRACT

A child stroller frame includes a first frame portion including a handle frame segment and a front leg segment pivotally connected with each other, a second frame portion pivotally connected with the front leg segment, a pivoting part having one end fixedly connected with a wheel support member and another end pivotally connected with the second frame portion, and a linkage movably coupling the first frame portion to the pivoting part. The linkage has a first end pivotally connected with the front leg segment, a second end pivotally connected with the pivoting part, and an intermediate portion between the first end and the second end that is pivotally connected with the second frame portion, whereby the first frame portion and the wheel support member are movably linked for folding in a concurrent manner toward the second frame portion.

19 Claims, 5 Drawing Sheets

(56) References Cited

U.S. PATENT DOCUMENTS

| | | | | |
|---|---|---|---|---|
| 7,188,858 | B2* | 3/2007 | Hartenstine | B62B 7/123 296/107.02 |
| 7,364,182 | B2* | 4/2008 | Jane Santamaria | B62B 7/10 280/47.38 |
| 7,419,181 | B2* | 9/2008 | Kassai | B62B 7/08 280/650 |
| 7,527,283 | B2* | 5/2009 | Horacek | B62B 7/08 280/642 |
| 7,883,104 | B2* | 2/2011 | Driessen | B62B 7/08 280/658 |
| 8,083,240 | B2* | 12/2011 | Jacobs | B62B 9/18 280/47.38 |
| 8,602,442 | B2* | 12/2013 | Li | B62B 7/08 280/647 |
| 8,696,016 | B2* | 4/2014 | Homan | B62B 9/104 280/47.38 |
| 8,991,852 | B2* | 3/2015 | Mitzman | B62B 7/08 280/642 |
| 9,242,665 | B2* | 1/2016 | Offord | B62B 7/105 |
| 9,266,549 | B2* | 2/2016 | Jane Santamaria | B62B 7/10 |
| 9,327,750 | B2* | 5/2016 | Yi | B62B 7/10 |
| 9,393,982 | B2* | 7/2016 | Tomasi | B62B 7/06 |
| 9,428,208 | B1* | 8/2016 | Chen | B62B 9/185 |
| 9,545,938 | B2* | 1/2017 | Liu | B62B 7/083 |
| 9,725,106 | B2* | 8/2017 | Pos | B62B 9/102 |
| 9,776,652 | B2* | 10/2017 | Zhong | B62B 7/10 |
| 9,849,902 | B1* | 12/2017 | Liao | B62B 7/068 |
| 9,988,064 | B2* | 6/2018 | Liao | B62B 7/10 |
| 10,023,217 | B2* | 7/2018 | Sack | B62B 7/10 |
| 10,077,063 | B2* | 9/2018 | Haut | B62B 7/10 |
| 10,913,478 | B1* | 2/2021 | Zhou | B62B 7/105 |
| 11,161,539 | B2* | 11/2021 | Day | B62B 7/12 |
| 2017/0313339 | A1* | 11/2017 | Ruggiero | B62B 7/105 |
| 2018/0029625 | A1* | 2/2018 | Ruggiero | B60N 2/2845 |
| 2022/0063697 | A1* | 3/2022 | Zhong | B62B 7/105 |

\* cited by examiner

CHILD STROLLER FRAME

CROSS-REFERENCE TO RELATED APPLICATION(S)

This application is a continuation of U.S. patent application Ser. No. 16/736,783 filed on Jan. 7, 2020, which claims priority to Chinese patent application no. 201910019182.X filed on Jan. 8, 2019.

BACKGROUND

1. Field of the Invention

The present invention relates to child stroller frames.

2. Description of the Related Art

A child stroller apparatus is generally constructed from a frame structure that can be collapsed for storage or transport and unfolded for use. In some existing stroller frame structures, the rear wheels may be provided with a separate folding mechanism, and a caregiver has to separately operate the stroller frame and the folding mechanism of the rear wheels for collapsing the child stroller apparatus. This type of stroller frames is more cumbersome in use as it requires multiple operating steps for folding the stroller apparatus. Moreover, because the folding mechanism of the rear wheels is usually placed at a lower position, the caregiver needs to bend over to operate the folding mechanism.

Therefore, there is a need for an improved stroller frame that can be more convenient in use and address at least the foregoing issues.

SUMMARY

The present application describes a child stroller frame that can be folded and unfolded in a convenient manner.

According to an embodiment, a child stroller frame includes a first frame portion including a handle frame segment and a front leg segment pivotally connected with each other, a second frame portion pivotally connected with the front leg segment, a pivoting part having one end fixedly connected with a wheel support member and another end pivotally connected with the second frame portion, and a linkage movably coupling the first frame portion to the pivoting part. The linkage has a first end pivotally connected with the front leg segment, a second end pivotally connected with the pivoting part, and an intermediate portion between the first end and the second end that is pivotally connected with the second frame portion, whereby the first frame portion and the wheel support member are movably linked for folding in a concurrent manner toward the second frame portion.

According to another embodiment, a child stroller frame includes a first and a second frame portion, a pivoting part, and a linkage movably coupling the first frame portion to the pivoting part. The second frame portion has a front end and a rear end, the front end of the second frame portion being pivotally connected with the first frame portion. The pivoting part has one end fixedly connected with a rear wheel support member and another end pivotally connected with the rear end of the second frame portion. The linkage includes a plurality of bars, a first one of the bars being formed integrally as a single body having has a first and a second bar portion that intersect each other at an angle, the second frame portion being pivotally connected with the first bar in a region thereof where the first bar portion joins with the second bar portion, whereby the first frame portion and the rear wheel support member are movably linked for folding in a concurrent manner toward the second frame portion.

DETAILED DESCRIPTION OF THE EMBODIMENTS

Figure 1:
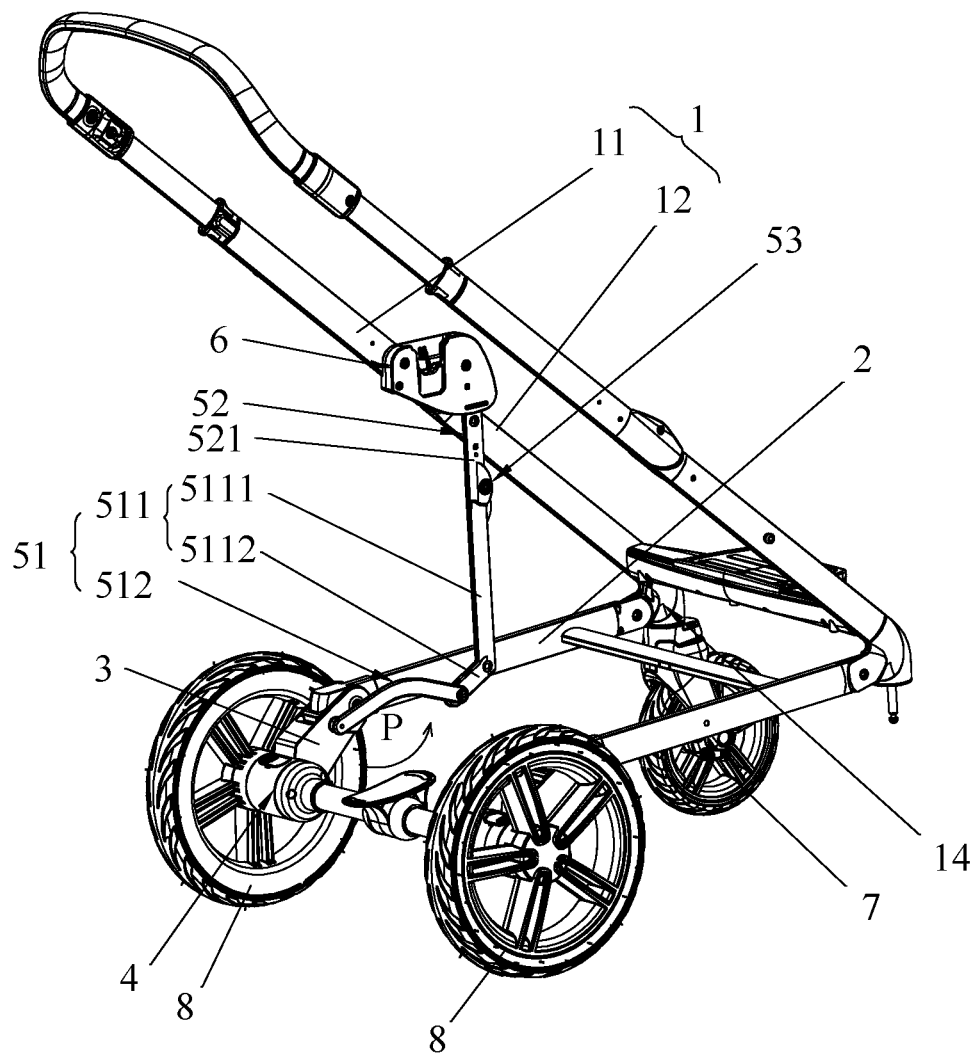
FIG. 1 is a perspective view illustrating an embodiment of a child stroller frame in an unfolded state.
Figure 2:
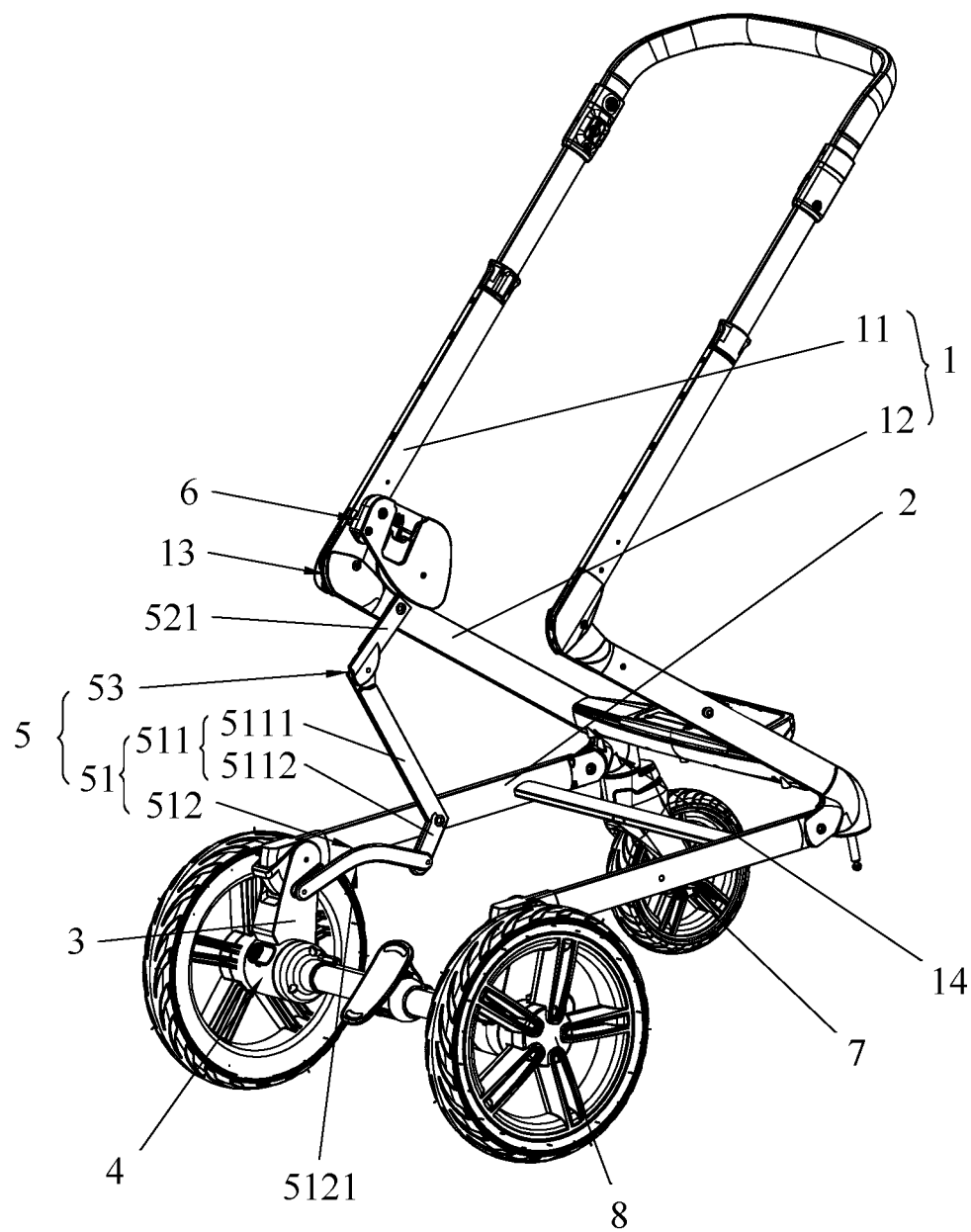
FIG. 2 is a perspective view illustrating the child stroller frame of FIG. 1 in a partially folded state.
Figure 3:
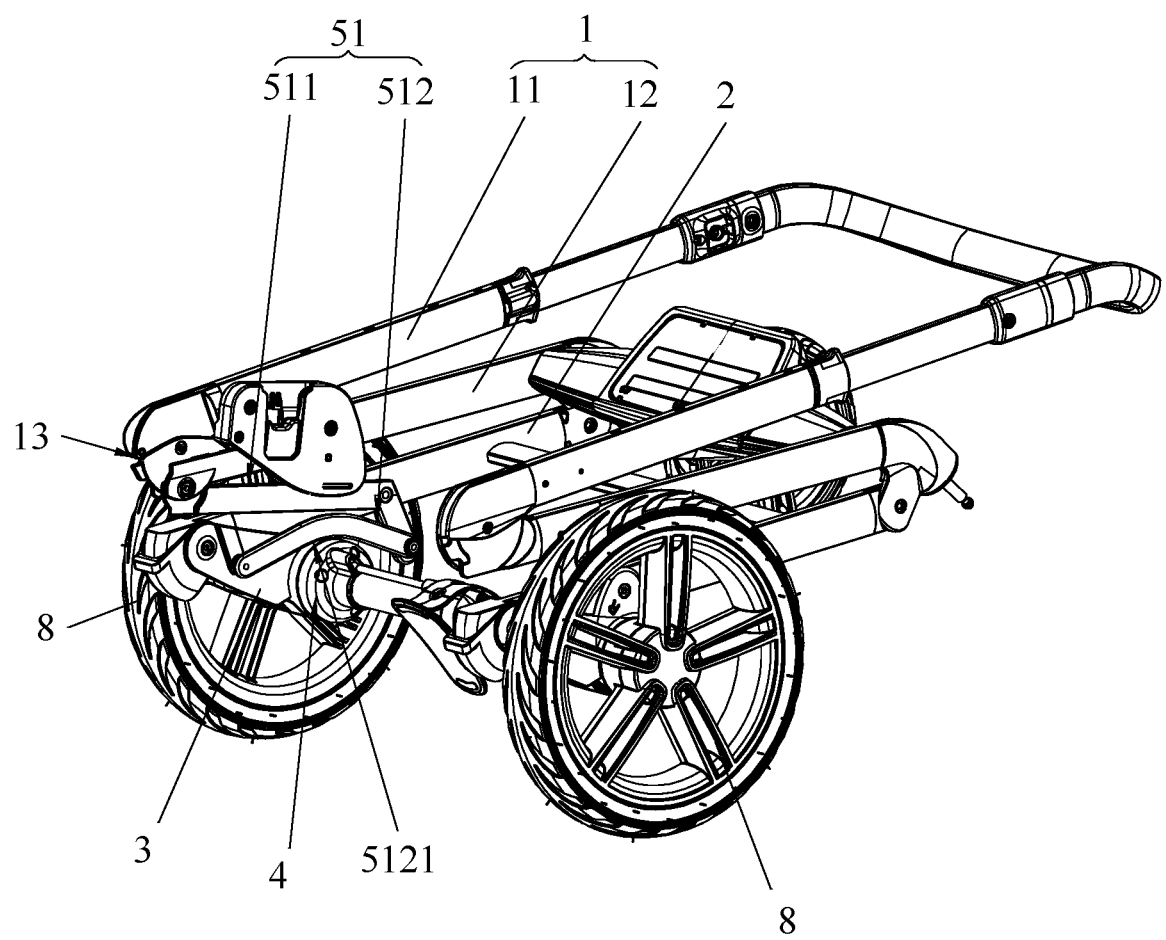
FIG. 3 is a perspective view illustrating the child stroller frame of FIG. 1 in a fully folded state.
Figure 4:
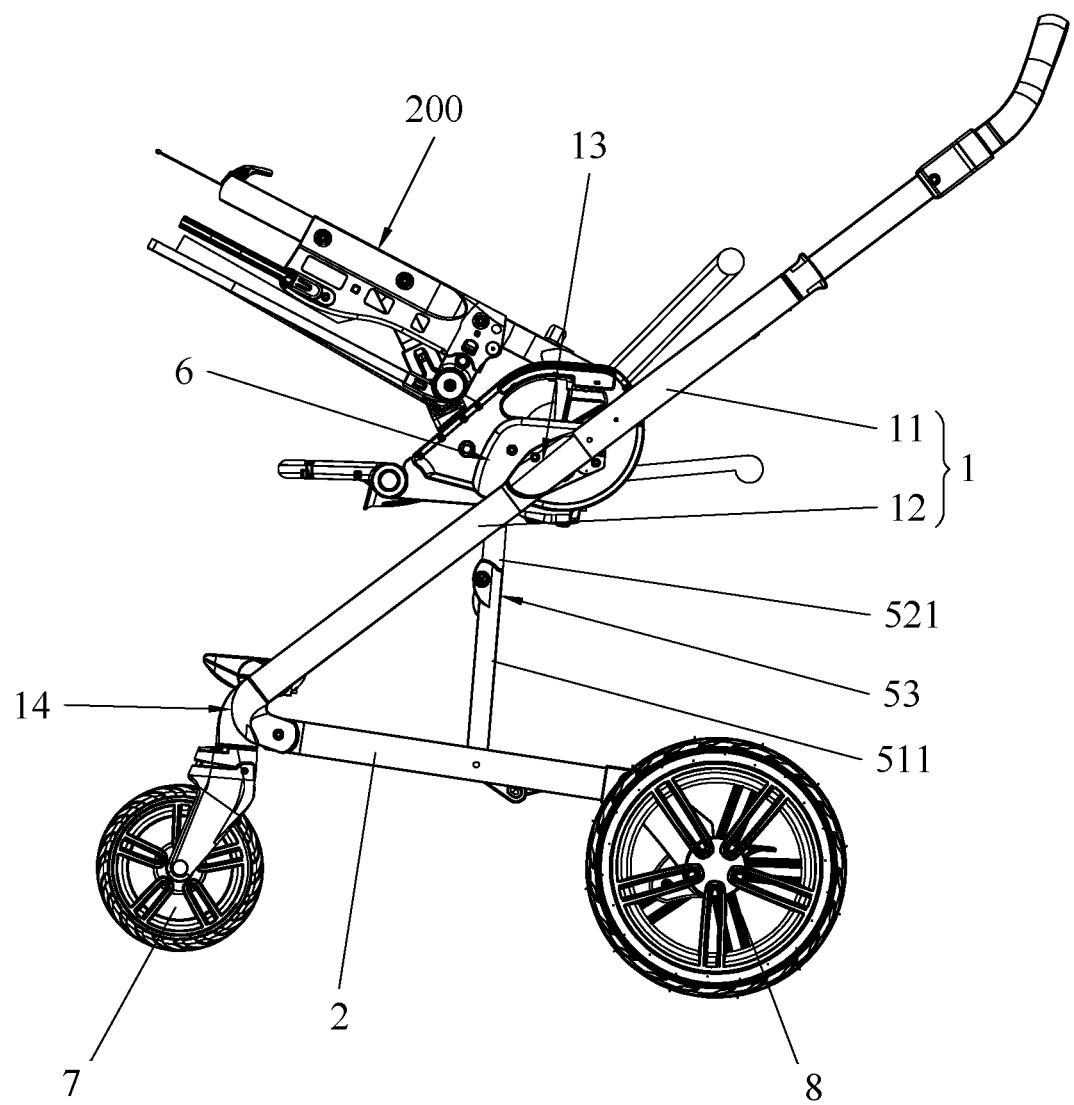
FIG. 4 is a side view illustrating the child stroller frame in the unfolded state with a child seat installed thereon.
Figure 5:
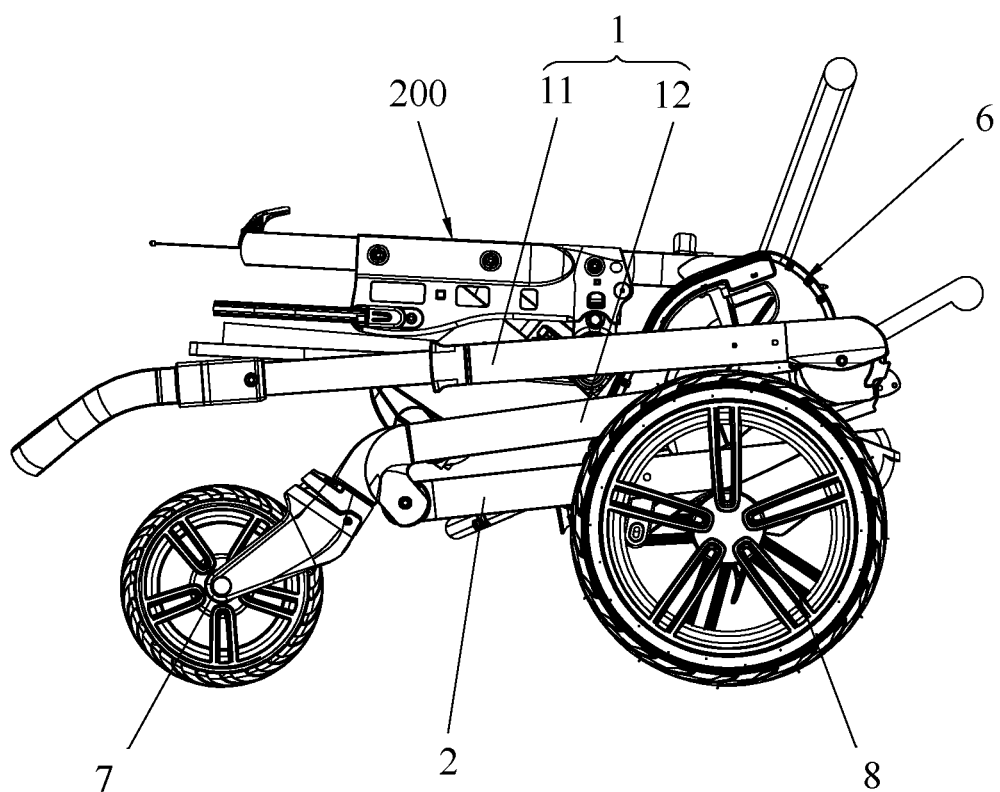
FIG. 5 is a side view illustrating the child stroller frame in the fully folded state with the child seat installed thereon.

FIGS. 1-3 are perspective views illustrating an embodiment of a child stroller frame 100 having a foldable rear wheel. Referring to FIGS. 1-3, the child stroller frame 100 can include a first frame portion 1, a second frame portion 2, a rear wheel support member 4 coupled to a rear wheel 8, a pivoting part 3 and a linkage 5.

The first frame portion 1 can extend upward and rearward at an angle relative to the second frame portion 2 when the child stroller frame 1 is unfolded for use, and can have a lower end provided with a front wheel 7. The front wheel 7 may be attached at the lower end of the first frame portion 1 and in front of the second frame portion 2.

The second frame portion 2 can have a front end pivotally connected with the first frame portion 1 and a rear end pivotally connected with the pivoting part 3. According to an example of construction, the second frame portion 2 may include a tube segment at each of the left and right side of the child stroller frame 100 that is oppositely connected pivotally with the first frame portion 1 and the pivoting part 3. The first and second frame portions 1 and 2 can rotate relative to each other for folding and unfolding the child stroller frame 100.

The pivoting part 3 can have an end fixedly connected with the rear wheel support member 4 and an opposite end pivotally connected with a rear end of the second frame portion 2. According to an example of construction, the pivoting part 3 may be movable as a single body. The pivoting part 3 can rotate relative to the second frame portion 2 to fold the rear wheel support member 4 carried on the pivoting part 3 toward the second frame portion 2 (the folding direction is shown with arrow P in FIG. 1) or unfold the rear wheel support member 4 away from the second frame portion 2.

The linkage 5 can movably couple the first frame portion 1 to the pivoting part 3, whereby the first frame portion 1 and the rear wheel support member 4 carried on the pivoting part 3 are movably linked for folding in a concurrent manner toward the second frame portion 2 or unfolding in a concurrently manner away from the second frame portion 2. More specifically, the linkage 5 can have a first and a second end opposite to each other that are respectively coupled to the first frame portion 1 and the pivoting part 3, and an intermediate portion between the first and second ends that is pivotally connected with the second frame portion 2. When the first frame portion 1 and the second frame portion 2 rotate relative to each other for folding the child stroller frame 100, the pivoting part 3 with the rear wheel support member 4 carried thereon can rotate and fold toward the second frame portion 2 owing to the coupling of the linkage 5. Accordingly, the rear wheel support member 4 and the rear wheel 8 provided thereon can be conveniently folded along with the folding of the child stroller frame 100 without the need for a caregiver to perform an additional step of bending over and operating the rear wheel 8.

According to an embodiment, the first frame portion 1 includes a handle frame segment 11 and a front leg segment 12 pivotally connected with each other. The second frame portion 2 has a front end that may be pivotally connected with any of the handle frame segment 11, the front leg segment 12, or a coupling part 13 that pivotally connects the handle frame segment 11 with the front leg segment 12; the linkage 5 has a first end that may be pivotally connected with any of the handle frame segment 11, the front leg segment 12 or the coupling part 13, a second end that is pivotally connected with the pivoting part 3, and an intermediate portion between the first and second ends that is pivotally connected with the second frame portion 2.

In the example shown in FIG. 1, the front end of the second frame portion 2 is pivotally connected with the front leg segment 12 adjacent to a front wheel mounting portion 14 thereof, and the first end of the linkage 5 is pivotally connected with the front leg segment 12. During folding of the child stroller frame 100, the front leg segment 12 can rotate and fold toward the second frame portion 2 while the handle frame segment 11 and the front leg segment 12 can rotationally fold over each other. The handle frame segment 11 and the front leg segment 12 can thereby fold to lie at one same side of the second frame portion 2. Moreover, the pivoting part 3 with the rear wheel support member 4 carried thereon can be urged to rotate concurrently and fold toward the second frame portion 2 owing to the coupling of the linkage 5.

It will be appreciated that other constructions of the child stroller frame 100 may be possible. For example, suppose the front end of the second frame portion 2 is pivotally connected with the coupling part 13 that pivotally connects the handle frame segment 11 with the front leg segment 12. The first end of the linkage 5 can be pivotally connected with the front leg segment 12 or the handle frame segment 11. During folding of the child stroller frame 100, the handle frame segment 11 can rotate in an anti-clockwise direction (i.e., corresponding to the direction P in FIG. 1) relative to the second frame portion 2 and fold toward the second frame portion 2, while the front leg segment 12 can rotate in a clockwise direction (i.e., opposite to the direction P) relative to the second frame portion 2 and fold toward the second frame portion 2. The handle frame segment 11 and the front leg segment 12 can thereby fold to respectively lie at two opposite sides of the second frame portion 2. As the handle frame segment 11 and the front leg segment 12 are folded toward the second frame portion 2, the linkage 5 can likewise cause the rear wheel support member 4 and the rear wheel 8 provided thereon to fold toward the second frame portion 2.

The rear wheel support member 4 described herein can provide support for attachment of the rear wheel 8. Various constructions may be applied for the rear wheel support member 4. According to an example of construction, the rear wheel support member 4 may include a transversal axle to which are attached two rear wheels 8. According to another example of construction, the rear wheel support member 4 may include a wheel mount to which is attached one rear wheel 8, two separate sets of the rear wheel support member 4 and the rear wheel 8 being respectively provided at the left and right sides of the second frame portion 2.

Referring to FIGS. 1-3, the linkage 5 can include a first bar assembly 51 and a second bar assembly 52. The first bar assembly 51 can be respectively connected pivotally with the second frame portion 2 and the pivoting part 3, wherein the first bar assembly 51, the pivoting part 3 and the second frame portion 2 can be configured to form a first bar linkage portion. The second bar assembly 52 can be respectively coupled to the first bar assembly 51 and the first frame portion 1. For example, the first bar assembly 51 can include a first bar 511 pivotally connected with the second frame portion 2, and the second bar assembly 52 can be respectively connected pivotally with the first bar 511 and the first frame portion 1. The second bar assembly 52, the first bar 511, the first frame portion 1 and the second frame portion 2 can be configured to form a second bar linkage portion. A relative rotation between the first frame portion 1 and the second frame portion 2 in a folding direction causes the first bar 511 to rotate relative to the second frame portion 2, which results in the first bar linkage portion to fold and the pivoting part 3 to rotate for folding the rear wheel support member 4 toward the second frame portion 2. In other words, the first and second bar assemblies 51 and 52 are operable to drive the rear wheel support member 4 to fold toward the second frame portion 2 when the first frame portion 1 rotates relative to the second frame portion 2 in a folding direction.

Referring to FIGS. 1-3, the first bar assembly 51 and the second bar assembly 52 may be located at an inner side of the pivoting part 3 to prevent environment interference during use. According to an example of construction, two sets of the first and second bar assemblies 51 and 52 can be symmetrically provided at the left and right sides of the child stroller frame 100. Moreover, the child stroller frame 100 may further include a seat mount 6 for installation of a detachable child seat 200. The installed child seat 200 may be collapsed along with the child stroller frame 100 into a compact form at an inner side of the child stroller frame 100.

Referring to FIGS. 1-3, the first bar assembly 51 can include a plurality of bars. The first bar assembly 51, the second frame portion 2 and the pivoting part 3 are configured to form a first bar linkage portion adapted to fold the pivoting part 3 and the rear wheel support member 4 carried thereon toward the second frame portion 2 during folding of the child stroller frame 100. For example, the first bar assembly 51, the second frame portion 2 and the pivoting part 3 may be configured to form a four-bar linkage. According to an example of construction, the first bar assembly 51 can include the first bar 511 and a second bar 512, the second bar 512 having two opposite ends respectively connected pivotally with the first bar 511 and the pivoting part 3. The first and second bars 511 and 512 of the first bar assembly 51, the second frame portion 2 and the pivoting part 3 can form the first bar linkage portion that is operable to cause the pivoting part 3 and the rear wheel 8 carried thereon to fold toward the second frame portion 2. More specifically, a rotation of the first bar 511 relative to the second frame portion 2 in a folding direction can cause the second bar 512 to move and urge the pivoting part 3 to rotate relative to the second frame portion 2 in the direction P for folding toward the second frame portion 2. The second bar 512 can have a shape 5121 configured to achieve compact folding and prevent obstructing interference with the pivoting part 3 and/or the rear wheel support member 4 during folding movement. For example, the shape 5121 of the second bar 512 may include a curved profile with a concavity facing downward.

Referring to FIGS. 1-3, the second bar assembly 52 can include one or a plurality of bars. The second bar assembly 52, the first bar 511, the first frame portion 1 and the second frame portion 2 can be configured to form a second bar linkage portion. According to an example of construction, the second bar linkage portion may be a four-bar linkage. For example, the second bar assembly 52 can include a third bar 521 having two opposite ends respectively connected pivotally with the first bar 511 and the first frame portion 1. The first bar 511, the third bar 521, the first frame portion 1 and the second frame portion 2 can thereby form the second bar linkage portion.

Referring to FIGS. 1-3, the first bar 511 can have two bar portions 5111 and 5112 that intersect each other at an angle. The first bar 511 including the bar portions 5111 and 5112 may be formed integrally as a single body. According to an example of construction, the bar portion 5111 may have an elongate shape with a length greater than the length of the bar portion 5112. The first bar 511 can be pivotally connected with the second bar assembly 52 at an end of the bar portion 5111, and the bar portion 5112 can extend at an angle from the bar portion 5111 toward the second bar 512 and pivotally connect with the second bar 512. According to an example of construction, the second bar 512 has a nonlinear shape, and the shape and/or length of the bar portion 5112 may be configured in accordance with the desired folding shape of the first and second bars 511 and 512 so that the first bar linkage portion can be collapsed into a smaller volume. According to an example of construction, the pivot connection between the first bar 511 and the second frame portion 2 can be located at the joining region between the two bar portions 5111 and 5112. According to an example of implementation, the bar portion 5112 of the first bar 511, the second bar 512, the second frame portion 2 and the pivoting part 3 can form a first bar linkage portion; the bar portion 5111 of the first bar 511, the third bar 521, the second frame portion 2 and the first frame portion 1 can form a second bar linkage portion.

Moreover, a limiting structure 53 can be disposed between the bar portion 5111 and the second bar assembly 52. According to an example of construction, the limiting structure 53 can include a limiting joint pivotally coupling the bar portion 5111 of the first bar 511 to the third bar 521. When the child stroller frame 100 is in an unfolded state for use, the bar portion 5111 of the first bar 511 and the second bar assembly 52 (in particular the third bar 521 thereof) can form a substantially straight shape that extends between the first frame portion 1 and the second frame portion 2 and can provide stable support for the first frame portion 1. According to an example of construction, the first bar 511 can have a L-shape.

Exemplary operation of the child stroller frame 100 is described hereinafter with reference to FIGS. 1-5. When the child stroller frame 100 is to be collapsed, the first frame portion 1 can be rotated for folding relative to the second frame portion 2. More specifically, the front leg segment 12 can rotate and fold toward the second frame portion 2, which results in folding of the second bar linkage portion. As the second bar linkage folds, the first bar 511 rotates relative to the second frame portion 2, which actuates the first bar linkage portion so that the pivoting part 3 rotates in the direction P and folds toward the second frame portion 2. As a result, the rear wheel support member 4 can be displaced by the pivoting part 3 to a position adjacent to the second frame portion 2 and in front of the pivot connection between the second frame portion 2 and the pivoting part 3. Moreover, the handle frame segment 11 can rotate and fold over the front leg segment 12 so that the size of the first frame portion 1 can be reduced and the child seat 200 can be positioned compactly at an inner side of the folded child stroller frame 100.

When the child stroller frame 100 is to be unfolded for use, the handle frame segment 11, the front leg segment 12 and the second frame portion 2 can be reversely rotated relative to one another, which causes the pivoting part 3 to rotate and unfold from the second frame portion 2 owing to the first and second bar linkage portions. As a result, the rear wheel support member 4 can be displaced by the pivoting part 3 to a position away from the second frame portion 2 and behind the pivot connection between the second frame portion 2 and the pivoting part 3.

Since the rear wheel support member 4 is movably linked to the child stroller frame 100, the rear wheel support member 4 may be held in the unfolded or folded state without the need of providing an additional locking mechanism for locking the rear wheel support member 4 in position relative to the second frame portion 2.

Advantages of the structures described herein include the ability to provide a child stroller frame that has a foldable rear wheel support member, whereby the child stroller frame can be folded into a compact form. The rear wheel support member can be movably coupled to the other frame portions of the child stroller frame with a linkage, thereby allowing the entire stroller frame to fold and unfold in a convenient manner.

Realization of the child stroller frame has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child stroller frame comprising:
a first frame portion including a handle frame segment and a front leg segment pivotally connected with each other;
a second frame portion pivotally connected with the front leg segment;
a pivoting part having one end fixedly connected with a wheel support member and another end pivotally connected with the second frame portion; and
a linkage movably coupling the first frame portion to the pivoting part, the linkage having a first end pivotally connected with the front leg segment, a second end pivotally connected with the pivoting part, and an intermediate portion between the first end and the second end that is pivotally connected with the second frame portion, whereby the first frame portion and the wheel support member are movably linked for folding in a concurrent manner toward the second frame portion;
wherein the second frame portion has two opposite ends, and the intermediate portion of the linkage is pivotally connected with the second frame portion at a fixed position relative to the two opposite ends of the second frame portion.

2. The child stroller frame according to claim 1, wherein the front leg segment is pivotally connected with the second frame portion at one of the two opposite ends thereof, and the pivoting part is pivotally connected with the second frame portion at the other one of the two opposite ends thereof.

3. The child stroller frame according to claim 1, wherein the wheel support member is a rear wheel support member.

4. The child stroller frame according to claim 1, wherein the wheel support member includes a transversal axle or a wheel mount.

5. The child stroller frame according to claim 1, wherein the linkage includes a first bar, a second bar and a third bar, the first bar being pivotally connected with the second frame portion and having two opposite ends respectively connected pivotally with the second bar and the third bar, the second bar being pivotally connected with the pivoting part, and the third bar being pivotally connected with the front leg segment.

6. The child stroller frame according to claim 5, wherein the second bar includes a curved profile with a concavity facing downward.

7. The child stroller frame according to claim 5, wherein the first bar has a L-shape.

8. The child stroller frame according to claim 5, wherein the first bar has a first and a second bar portion that intersect each other at an angle, and the second frame portion is pivotally connected with the first bar in a region thereof where the first bar portion joins with the second bar portion.

9. The child stroller frame according to claim 8, wherein the first bar including the first and second bar portions is formed integrally as a single body.

10. The child stroller frame according to claim 8, wherein the first and second bar portions are extendible to two opposite sides of the second frame portion.

11. A child stroller frame comprising:
a first and a second frame portion, the second frame portion having a front end and a rear end, the front end of the second frame portion being pivotally connected with the first frame portion;
a pivoting part having one end fixedly connected with a rear wheel support member and another end pivotally connected with the rear end of the second frame portion; and
a linkage movably coupling the first frame portion to the pivoting part, wherein the linkage includes a plurality of bars, a first one of the bars being formed integrally as a single body having has a first and a second bar portion that intersect each other at an angle, an intermediate portion of the second frame portion between the front end and the rear end thereof being pivotally connected with the first bar in a region thereof where the first bar portion of the first bar joins with the second bar portion of the first bar, whereby the first frame portion and the rear wheel support member are movably linked for folding in a concurrent manner toward the second frame portion.

12. The child stroller frame according to claim 11, wherein the first frame portion includes a handle frame segment and a front leg segment pivotally connected with each other.

13. The child stroller frame according to claim 12, wherein the child stroller frame is folded either with the handle frame segment and the front leg segment lying at one same side of the second frame portion, or with the handle frame segment and the front leg segment respectively lying at two opposite sides of the second frame portion.

14. The child stroller frame according to claim 12, wherein the linkage has a first end pivotally connected with the front leg segment and a second end pivotally connected with the pivoting part.

15. The child stroller frame according to claim 11, wherein the second frame portion includes a tube segment having two opposite sides extending between the front end and the rear end of the second frame portion, and the first bar portion and the second bar portion are respectively extendible at the two opposite sides of the tube segment of the second frame portion.

16. The child stroller frame according to claim 11, wherein the bars of the linkage include a second bar and a third bar, the second bar being respectively connected pivotally with the first bar and the pivoting part, and the third bar being respectively connected pivotally with the first bar and the first frame portion.

17. The child stroller frame according to claim 16, wherein the second bar includes a curved profile with a concavity facing downward.

18. The child stroller frame according to claim 11, wherein the rear wheel support member includes a transversal axle or a wheel mount.

19. The child stroller frame according to claim 11, wherein the first bar is pivotally connected with the second frame portion at a fixed position relative to the front end and the rear end of the second frame portion.

* * * * *